(12) United States Patent
Cai et al.

(10) Patent No.: US 8,178,633 B2
(45) Date of Patent: May 15, 2012

(54) GAS-PHASE POLYMERIZATION PROCESS HAVING MULTIPLE FLOW REGIMES

(75) Inventors: Ping Cai, Lake Jackson, TX (US); Linfeng Chen, Missouri City, TX (US); Jan W. Van Egmond, Charleston, WV (US); Michael W. Tilston, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/970,617

(22) Filed: Dec. 16, 2010

(65) Prior Publication Data

US 2011/0152424 A1  Jun. 23, 2011

Related U.S. Application Data

(60) Provisional application No. 61/288,580, filed on Dec. 21, 2009.

(51) Int. Cl.
| C08F 2/38 | (2006.01) |
| C08F 4/649 | (2006.01) |
| C08F 2/00 | (2006.01) |
| C08F 10/06 | (2006.01) |

(52) U.S. Cl. .......... 526/88; 526/65; 526/125.3; 526/128
(58) Field of Classification Search .................... 526/65, 526/88, 125.3, 128
See application file for complete search history.

(56) References Cited

U.S. PATENT DOCUMENTS

| 4,543,399 A | 9/1985 | Jenkins, III et al. |
| 4,588,790 A | 5/1986 | Jenkins, III et al. |
| 4,994,534 A | 2/1991 | Rhee et al. |
| 5,352,749 A | 10/1994 | DeChellis et al. |
| 5,436,304 A | 7/1995 | Griffin et al. |
| 5,462,999 A | 10/1995 | Griffin et al. |
| 5,698,642 A | 12/1997 | Govoni et al. |
| 6,460,412 B1 | 10/2002 | Cai et al. |
| 6,489,408 B2 | 12/2002 | Mawson et al. |
| 6,818,187 B2 * | 11/2004 | Govoni et al. ................ 422/131 |
| 6,825,146 B2 | 11/2004 | Kilty et al. |
| 7,405,260 B2 | 7/2008 | Mei et al. |
| 2005/0137364 A1 | 6/2005 | Cai et al. |
| 2007/0027275 A1 * | 2/2007 | Chen et al. ....................... 526/65 |
| 2009/0203863 A1 * | 8/2009 | Chen ............................. 526/194 |
| 2009/0209706 A1 | 8/2009 | Sheard et al. |
| 2011/0054127 A1 * | 3/2011 | Rinaldi et al. .................. 526/65 |

FOREIGN PATENT DOCUMENTS

| EP | 1196238 A1 | 10/2005 |
| EP | 1720913 | 3/2009 |
| WO | WO-2005095465 A1 | 10/2005 |
| WO | WO-2009029486 A2 | 3/2009 |

OTHER PUBLICATIONS

Wen and Yu 1966 AIChE Journal, vol. 12, p. 610.
PCT/US2010/060827—International Search Report, (dated Mar. 16, 2011).

* cited by examiner

Primary Examiner — Fred M Teskin

(57) ABSTRACT

The present invention relates to an improvement for gas phase olefin polymerization process under two or more different flow regimes. The process involves adding a mixed electron donor system to a reactor having two or more different flow regimes, wherein the mixed electron donor system comprises at least one selectivity control agent and at least one activity limiting agent. The invention is particularly well suited for reactor systems which include a regime characterized by having a low-velocity or high-solid holdup, which have been reported to have operational problems such as particle agglomeration and formation of polymer "chunks".

17 Claims, No Drawings

GAS-PHASE POLYMERIZATION PROCESS HAVING MULTIPLE FLOW REGIMES

CROSS-REFERENCE TO RELATED APPLICATIONS

This application is a non-provisional application claiming priority from the U.S. Provisional Patent Application No. 61/288,580, filed on Dec. 21, 2009, entitled "GAS-PHASE POLYMERIZATION PROCESS HAVING MULTIPLE FLOW REGIMES," the teachings of which are incorporated by reference herein, as if reproduced in full hereinbelow.

FIELD OF THE INVENTION

The present invention relates to an improvement for gas phase olefin polymerization process under two or more different flow regimes. The improvement involves the use of a mixed external electron donor feed.

BACKGROUND AND SUMMARY OF THE INVENTION

The demand for high-performance polypropylene homo- and copolymer products has resulted in advanced manufacturing technologies with unique features. One of the features is to have multiple sets of operating conditions during the polymerization. This allows multiple polymer components needed for different aspects of product performance, and/or the superior reactor operability and good product quality. Such multiple sets of operating conditions can be realized by the multi-stage polymerization (e.g., multiple reactors in series), multi-zone polymerization in a single reactor, or the combination of multi-stage and multi-zone polymerization process. In order to further differentiate the properties of the polymer components produced in such a process or for the purpose of process optimization, the operating conditions in different reactors or different reactor zones are often intentionally or unintentionally established under different flow regimes.

The term "flow regime" is a fluid mechanical concept which posses one or more unique features on the general flow pattern and/or system structure which distinguishes itself from other adjacent regimes. In single phase system, turbulent flow and laminar flow are the common examples of different flow regimes. In the multi-phase systems involved in advanced polymerization manufacturing, the situation is more complicated, and several flow regimes can be encountered, such as bubbling fluidization, turbulent fluidization, fast fluidization, pneumatic convey (dense-phase and dilute phase), packed moving bed, spouted bed and spout-fluid bed bed. Different flow regimes are differentiated by their flow patterns, phase distributions and holdups, heat and mass transfer, etc.

Different flow regimes maximize the opportunity in producing different polymer components. For example, the $2^{nd}$ and $1^{st}$ reactors used in The Dow Chemical Company's UNI-POL™ process to make impact copolymers are running under the turbulent fluidization regime and the lower end of the fast fluidization regime, respectively (WO2009029486). The Lyondellbasell's Spherizone reactor employs two reactor zones under fast fluidization and the packed moving-bed regimes, respectively (U.S. Pat. No. 5,698,642). Sabic Europe added a draft tube into the center of the UNIPOL™ reactor, to create a spout-fluid bed in which the annular zone is probably under turbulent fluidization regime and the zone within the center draft tube is likely under the dilute-phase fast fluidization regime (EP 1,196,238).

While the operation of multiple flow regimes within a reactor system offers benefits of product diversity, such systems may cause additional problems. In particular, a catalyst system which performs optimally under one flow regime may not perform the same when running under a different flow regime. For example, a catalyst system may operate properly in a high-velocity regime, but when in a low-velocity or high-solid-holdup regime could have operational problems such as particle agglomeration and formation of polymer "chunks", believed to be mainly due to inadequately heat removal and/or static adhesion. Such operational problem is documented, for example, in EP1,720,913, WO2005/095465, U.S. Pat. No. 7,405,260. Therefore, there is a need to develop an improvement polymerization process to overcome the operational problems associated with the multi-regime reactor system.

Previous attempts to solve such operational problems include, for example, EP1,720,913, which describes the feed of multiple liquid streams continuously into a packed moving-bed zone of a polymerization reactor at certain mass flow rates for the "control of particle flow" and reactor pluggage prevention. Multiple liquid injection adds undesired complexity to the process and adds cost. In addition, many polymerization reactor systems involving multi-flow-regimes require the use of pre-polymerization. Pre-polymerization may improve dispersion of catalyst active sites and therefore reduce the probability of local overheating that may lead to the agglomeration of polymer particles; but it also adds additional investment and operational cost. Thus, there is a need to develop a solution to the operational problem in multi-regime polymerization reactor system that can be easily applied, and with relatively low cost and low operational complicity.

The present invention is an improvement for gas-phase polymerization processes employing two or more different flow regimes. The improvement involves the use of a mixed external electron donor feed.

DETAILED DESCRIPTION OF THE INVENTION

All references to the Periodic Table of the Elements herein shall refer to the "Periodic Table of the Elements," published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The procatalyst composition of the present catalyst composition may be a Ziegler-Natta procatalyst composition. Any conventional Ziegler-Natta procatalyst may be used in the present catalyst composition as is commonly known in the art. In an embodiment, the Ziegler-Natta procatalyst composition contains titanium chloride, magnesium chloride, and optionally an internal electron donor.

The present invention relates to the use of special donor mixture which can sufficiently modify the kinetic profile of the polymerization and thus eliminate "hot" spots in the reactor associated with agglomeration or chunk formation. In this way, the reactor can avoid the polymer-particle agglomeration and the pluggage of different locations in the production system (e.g., polymerization reactor, product discharge port, gas-recycle pipe, compressor, heat exchanger, etc.).

This invention can be applied to any gas-phase polymerization system including two or more different gas-solid flow regimes. Gas-solid flow regimes include homogeneous fluidization, bubbling fluidization, turbulent fluidization, fast fluidization (including the so-called "high density circulating fluidized bed"), spouted bed, spout-fluid bed, pneumatic convey (dense-phase and dilute phase), packed bed (fixed bed), packed (or fixed) moving bed (including the mass flow and funnel flow), and any other system with multiple flow patterns or regimes within a single polymerization zone. The gas and solid can contact in any way including co-current, counter-current, solid batch, etc. The process of the present invention can optionally include pre-polymerization, but it is not mandatory.

This invention can especially benefit those reactor system in which at least one of the flow regimes is with a relatively high solid holdup. A higher solid holdup typically results in a higher possibility of particle agglomeration. The term "solid holdup" means the volumetric fraction of the solid in a gas-solid system. The solid holdup can be determined in different ways. One of the commonly used methods is to measure the fluidization bed weight and bed height via differential-pressure measurement (through taps on the reactor wall). Then the volume and holdup of the solid in the reactor can be estimated, with the information of particle density. In some embodiments, this invention is used with (but not limited to) reactor systems in which at least one of the flow regimes is with a solid holdup larger than 0.15 (or 15%), preferably larger than 0.18 (or 18%) and most preferably larger than 0.21 (or 21%). For practical reasons the upper limit for solid holdup will typically be less than 0.7 (or 70%).

This invention also benefits those reactor systems having a relatively high fluidized bulk density (also known as "FBD"). FBD, as used herein, is the weight of solids in the unit volume of the gas-solid system. For purposes of this invention, when extending this concept to the non-fluidization regimes in this invention, such as the packed moving bed or the dilute-phase pneumatic convey, that terminology can still be used to mean the weight of solid per unit volume of the gas-solid system. FBD can be determined by different methods, such as pressure drop measurement, direct bed weight and bed height measurement (e.g., U.S. Pat. No. 6,460,412). The present invention is particularly applicable for reactor systems having an FBD of 8 lb/ft$^3$ or more, or 10 lb/ft$^3$ or more, or even 12 lb/ft$^3$ or more.

Within a given flow regime, the value of solid holdup and FBD can be changed within a certain range by manipulating the reactor operating conditions.

Similarly, this invention can particularly benefit those reactor system in which at least one of the flow regimes is with a relatively low gas velocity, because a lower gas velocity typically results in a higher possibility of particle agglomeration. In some embodiments, this invention is used with (but not limited to) a reactor system in which at least one of the flow regimes is having a superficial gas velocity less than 23 times of the minimum fluidization velocity, and preferably less than 20 times of the minimum fluidization velocity and most preferably less than 15 times of the minimum fluidization velocity. It is contemplated that the present invention may have particular applicability where the superficial velocity is near or even below the minimum fluidization velocity. The minimum fluidization velocity can be measured in the way described in any fluidization text book. However, it is practically not very convenient to measure under the reaction conditions. So it can be approximated using well-known equations such as the one published by Wen and Yu in 1966 (AIChE J., Vol. 12, p. 610).

In another embodiment, the processes disclosed herein may be operated in a condensing mode, similar to those disclosed in U.S. Pat. Nos. 4,543,399, 4,588,790, 4,994,534, 5,352,749, 5,462,999, and 6,489,408, and U.S. Patent Application Publication No. 20050137364. Condensing mode processes may be used to achieve higher cooling capacities and, hence, higher reactor productivity. In addition to condensable fluids of the polymerization process itself, including monomer(s) and co-monomer(s), other condensable fluids inert to the polymerization may be introduced to induce a condensing mode operation, such as by the processes described in U.S. Pat. No. 5,436,304.

More specifically, this invention involves the use of a catalyst composition comprising: a pro-catalyst composition; a co-catalyst; and a mixed external electron donor (M-EED) of two or more different components which includes at least one activity limiting agent (ALA) and at least one selectivity control agent (SCA). As used herein, an "external electron donor" is a composition added independent of procatalyst formation that modifies the catalyst performance. As used herein, an "activity limiting agent" is a composition that decreases catalyst activity as the catalyst temperature rises above a threshold temperature (e.g., temperature greater than about 85° C.). A "selectivity control agent" is a composition that improves polymer tacticity. It should be understood that the above definitions are not mutually exclusive and that a single compound may be classified, for example, as both an activity limiting agent and a selectivity control agent.

The mixed external electron donor compound for use in the present invention preferably includes at least one carboxylate compound. The carboxylate compound can be either an ALA and/or a SCA component.

The selectivity control agent(s) (SCA) may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In an embodiment, the external electron donor includes an alkoxysilane. The alkoxysilane has the general formula: SiR$_m$(OR')$_{4-m}$ (I) where R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a C$_{1-4}$ alkyl group; and m is 0, 1, 2 or 3. In an embodiment, R is C$_{6-12}$ arylalkyl or aralkyl, C$_{3-12}$ cycloalkyl, C$_{3-12}$ branched alkyl, or C$_{3-12}$ cyclic or acyclic amino group, R' is C$_{1-4}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In an embodiment, the silane composition is dicyclopentyldimethoxysilane (DCPDMS), methylcyclohexyldimethoxysilane (MChDMS), or n-propyltrimethoxysilane (NPTMS), and any combination of thereof.

In an embodiment, the selectivity control agent component can be a mixture of 2 or more alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane.

In an embodiment, the mixed external electron donor may include a benzoate, a succinate, and/or a diol ester. In an embodiment, the mixed external electron donor includes 2,2,6,6-tetramethylpiperidine as an SCA. In another embodiment, the mixed external electron donor includes a diether as both an SCA and an ALA.

The mixed external electron donor system also includes an activity limiting agent (ALA). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), a diol ester, and combinations thereof. The carboxylic acid ester can be an aliphatic or aromatic, mono- or poly-carboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl p-isopropoxybenzoate, ethyl acrylate, methyl methacrylate, ethyl acetate, ethyl p-chlorobenzoate, hexyl p-aminobenzoate, isopropyl naphthenate, n-amyl toluate, ethyl cyclohexanoate and propyl pivalate.

Nonlimiting examples of suitable polycarboxylic acid esters include dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, diethyl terephthalate, dioctyl terephthalate, and bis[4-(vinyloxy)butyl] terephthalate.

The aliphatic carboxylic acid ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents.

Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ alkyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be a laurate, a myristate, a palmitate, a stearate, an oleate, a sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate or di-n-butyl sebacate.

In an embodiment, the activity limiting agent includes a diether. The diether can be a 1,3-diether compound represented by the following structure (VI):

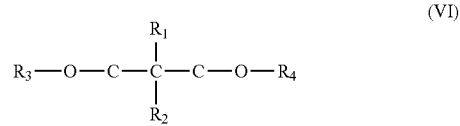

wherein $R_1$ to $R_4$ are independently of one another an alkyl, aryl or aralkyl group having up to 20 carbon atoms, which may optionally contain a group 14, 15, 16, or 17 heteroatom, and $R_1$ and $R_2$ may be a hydrogen atom. The dialkylether may linear or branched, and may include one or more of the following groups: alkyl, cycloaliphatic, aryl, alkylaryl or arylalkyl radicals with 1-18 carbon atoms, and hydrogen. $R_1$ and $R_2$ may be linked to form a cyclic structure, such as cyclopentadiene or fluorene.

In an embodiment, the activity limiting agent includes a succinate composition having the following structure (VII):

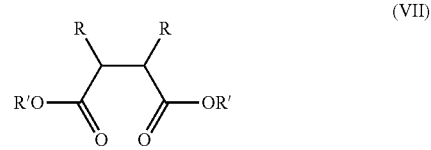

wherein R and R' may be the same or different, R and/or R' including one or more of the following groups: hydrogen, linear or branched alkyl, alkenyl, cycloalkyl, aryl, arylalkyl or alkylaryl group, optionally containing heteroatoms. One or more ring structures can be formed via one or both 2- and 3-position carbon atom.

In an embodiment, the activity limiting agent includes a diol ester as represented by the following structure (VIII):

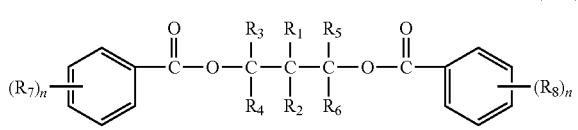

(VIII)

wherein n is an integer from 1 to 5. $R_1$ and $R_2$, may be the same or different, and each may be selected from hydrogen, methyl, ethyl, n-propyl, i-propyl, n-butyl, i-butyl, t-butyl, allyl, phenyl, or halophenyl group. $R_3$, $R_4$, $R_5$, $R_6$, $R_7$, and $R_8$ may be the same or different, and each may be selected from hydrogen, halogen, substituted, or unsubstituted hydrocarbyl having 1 to 20 carbon atoms. $R_1$-$R_6$ groups may optionally contain one or more heteroatoms replacing carbon, hydrogen or both, the hetero-atom selected from nitrogen, oxygen, sulfur, silicon, phosphorus and a halogen. $R_7$ and $R_8$, may be the same or different, and may be bonded to any carbon atom of the 2-, 3-, 4-, 5-, and 6-position of either phenyl ring.

The individual external electron donor components can be added into the reactor separately or two or more can be mixed together in advance and then added into the reactor as a mixture. In the mixture, more than one selectivity control agent or more than one activity limiting agent can be used. In an embodiment, the mixture is dicyclopentyldimethoxysilane and isopropyl myristate, diisopropyldimethoxysilane and isopropyl myristate, dicyclopentyldimethoxysilane and poly(ethylene glycol) laurate, dicyclopentyldimethoxysilane and isopropyl myristate and poly(ethylene glycol) dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, diisopropyldimethoxysilane and n-propyltriethoxysilane and isopropyl myristate, and dicyclopentyldimethoxysilane and tetraethoxysilane and isopropyl myristate, dicyclopentyldimethoxysilane and diisopropyldimethoxysilane and n-propyltriethoxysilane and isopropyl myristate, and combinations thereof.

The M-EEP, whether added separately or pre-mixed, may be added at any point in the reactor, although the ALA should be present in the areas considered to be a greatest risk for agglomeration, such as the areas with highest solid holdup, highest FBD and/or lowest gas velocity.

The present catalyst composition includes a cocatalyst. The cocatalyst for use with the foregoing Ziegler-Natta procatalyst composition may be an aluminum containing composition. Nonlimiting examples of suitable aluminum containing compositions include organoaluminum compounds, such as trialkylaluminum-, dialkylaluminum hydride-, alkylaluminum dihydride-, dialkylaluminum halide-, alkylaluminumdihalide-, dialkylaluminum alkoxide-, and alkylaluminum dialkoxide-compounds containing from 1-10, or 1-6 carbon atoms in each alkyl- or alkoxide-group. In an embodiment, the cocatalyst is a C1-4 trialkylaluminum compound, such as triethylaluminum (TEA). The catalyst composition includes a mole ratio of Al to (SCA(s)+ALA(s)) of 0.5-25:1, or 1.0-20:1, or 1.5-15:1, or less than about 6.0, or less than about 5, or less than 4.5. In an embodiment, the Al:(SCA(s)+ALA(s)) mole ratio is 0.5-4.0:1. The total-SCA to ALA mole ratio is 0.01-20:1, 0.10-5.00:1, 0.43-2.33:1, or 0.54-1.85:1, or 0.67-1.5:1.

EXAMPLES

The following examples are polymerization reactions which can be conducted in a dual-regime reactor similar to that described in FIG. 1 of U.S. Pat. No. 6,818,187, in which there is a riser section operated under dilute fast-fluidization regime, and a downcomer section operated under a packed-moving-bed regime. Both reactor sections are run with the same gas composition and very similar pressure. Polypropylene homo-polymer product or propylene-ethylene random copolymer product is made in the presence of hydrogen as a molecular weight regulator.

| Example | Comparative A | Comparative B | A | B |
|---|---|---|---|---|
| Catalyst | Z-N (see Example of US 6,825,146) | | | |
| Donor | DCPDMS (Dicyclopentyldimethoxysilane) (also called "D-Donor") | | 95 mol % DBS (di-n-butyl sebacate) + 5 mol % "C Donor" (methylcyclohexyldimethoxysilane) | |
| Product | Homo Polypropylene | Propylene-Ethylene Random Copolymer | Homo Polypropylene | Propylene-Ethylene Random Copolymer |
| Average Particle Size (mm) | 2 | 2 | 2 | 2 |
| Particle Settled Bulk Density (kg/m$^3$) | 415 | 432 | 415 | 430 |
| Average Reactor Total Pressure (Pa-gauge) | $3.24 \times 10^6$ | $3.10 \times 10^6$ | $3.38 \times 10^6$ | $3.24 \times 10^6$ |
| Controlled Reactor Temperature (° C.) | 72 | 65 | 72 | 65 |
| Gas Composition (mol %) | | | | |
| propylene | 77.23 | 66.13 | 77.1 | 65.8 |
| hydrogen | 0.31 | 0.26 | 0.31 | 0.26 |
| propane | 9.61 | 13.51 | 9.5 | 12.61 |
| nitrogen | 12.85 | 19.08 | 13.09 | 20.31 |
| ethylene | 0 | 1.01 | 0 | 1.01 |
| Gas Density (kg/m$^3$) | 67.39 | 61.10 | 67.13 | 60.04 |
| Gas Viscosity (Pa-s) | $1.27 \times 10^{-5}$ | $1.26 \times 10^{-5}$ | $1.27 \times 10^{-5}$ | $1.26 \times 10^{-5}$ |
| Umf (minimum fluidization velocity, m/s) | 0.035 | 0.037 | 0.035 | 0.038 |
| Riser Section Flow Regime | Fast Fluidization | Fast Fluidization | Fast Fluidization | Fast Fluidization |

-continued

| Example | Comparative A | Comparative B | A | B |
|---|---|---|---|---|
| Downcomer Section | | | | |
| Flow Regime | Packed Moving Bed | Packed Moving Bed | Packed Moving Bed | Packed Moving Bed |
| Average Superficial Gas Velocity (m/s) | 0.13 | 0.15 | 0.13 | 0.15 |
| Bed Bulk Density (FBD) (kg/m$^3$) | 376 | 392 | 376 | 390 |
| Velocity/Umf | 3.7 | 4.1 | 3.7 | 4.0 |
| Reactor Operation Performance | Severe polymer agglomeration forms in downcomer within hours; reactor will have to be shutdown for cleaning | Severe polymer agglomeration forms in downcomer within hours; reactor will have to be shutdown for cleaning | No operation problem, reactor will run continuously for several days | No operation problem, reactor will run continuously for several days |

It can be seen from Comparative Examples A&B that the reactor section with the flow regime of packed moving-bed is agglomeration prone with the commonly used "D-Donor." That is related to the nature of exothermic polymerization reaction, relatively very little movement among polymer particles and relatively low particle-to-bed heat transfer capability in such a dense-phase non-fluidization regime. When the "D-Donor" is replaced by the mixed electron donor system of this invention, the particle agglomeration is prevented for both the production of propypropylene homo product (Example A) and propylene-ethylene random copolymer product (Example B). Hence a continuous trouble-free operation of the reactor system is achieved.

The following embodiments are considered within the scope of the invention, and applicants reserve the right to amend the claims or to file one or more additional applications to specifically claim any of these embodiments which are not already expressly recited in the current listing of the claims:

1. A process to make polypropylene or propylene copolymer comprising:
   a. polymerizing propylene in a reactor having two or more different flow regimes;
   b. adding a mixed electron donor system to the reactor, wherein the mixed electron donor system comprises at least one selectivity control agent and at least one activity limiting agent.
2. The process of embodiment 1 wherein the activity limiting agent is a carboxylic acid ester, a diether, a poly(alkene glycol), a diol ester, or a combination thereof.
3. The process of any of the previous embodiments wherein the activity limiting agent is selected from a benzoate, a $C_4$-$C_{30}$ aliphatic acid ester and combinations thereof.
4. The process of any of the previous embodiments wherein the activity limiting agent is selected from a laurate, a myristate, a palmitate, a stearate, an oleate or combinations thereof.
5. The process of any of the previous embodiments wherein the selectivity control agent is selected from the group consisting of an alkoxysilane, an amine, an ether, a carboxylate, a ketone, an amide, a carbamate, a phosphine, a phosphate, a phosphite, a sulfonate, a sulfone, a sulfoxide, and combinations thereof.
6. The process of any of the previous embodiments wherein the selectivity control agent corresponds to the formula $SiR_m(OR')_{4-m}$, where R is $C_{3-12}$ cycloalkyl, $C_{3-12}$ branched alkyl, or $C_{3-12}$ cyclic or acyclic amino group, R' is $C_{1-4}$ alkyl, and m is 0, 1, or 2.
7. The process of any of the previous embodiments wherein the selectivity control agent is selected from dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane.
8. The process of any of the previous embodiments wherein the mixed external electron donor system is selected from the group consisting of: dicyclopentyldimethoxysilane and isopropyl myristate; diisopropyldimethoxysilane and isopropyl myristate; dicyclopentyldimethoxysilane and poly(ethylene glycol) laurate; dicyclopentyldimethoxysilane, isopropyl myristate and poly(ethylene glycol) dioleate; methylcyclohexyldimethoxysilane and isopropyl myristate; n-propyltrimethoxysilane and isopropyl myristate; dimethyldimethoxysilane, methylcyclohexyldimethoxysilane and isopropyl myristate; dicyclopentyldimethoxysilane and n-propyltriethoxysilane and isopropyl myristate; diisopropyldimethoxysilane, n-propyltriethoxysilane and isopropyl myristate; dicyclopentyldimethoxysilane, tetraethoxysilane and isopropyl myristate; dicyclopentyldimethoxysilane, diisopropyldimethoxysilane, n-propyltriethoxysilane and isopropyl myristate; and combinations thereof.
9. The process of any of the previous embodiments wherein the mixed external electron donor comprises three or more different electron donors.
10. The process of any of the previous embodiments wherein the reactor has two or more flow regimes selected from the group consisting of homogeneous fluidization, bubbling fluidization, turbulent fluidization, fast fluidization, spouted bed, spout-fluid bed, pneumatic convey (dense-phase and dilute phase), packed bed (fixed bed), packed (or fixed) moving bed and systems with multiple flow patterns within a single polymerization zone.
11. The process of any of the previous embodiments wherein at least one of the flow regimes has the volumetric solid holdup larger than 15%.
12. The process of any of the previous embodiments wherein at least one of the flow regimes has the superficial gas velocity less than 23 times of the minimum fluidization velocity.

13. The process of any of the previous embodiments, wherein the reactor system is making polypropylene homopolymer.
14. The process of any of the previous embodiments, wherein the reactor system is making ethylene-propylene copolymer.
15. The process of any of the previous embodiments, wherein the reactor system is making butene-propylene copolymer.
16. The process of any of the previous embodiments, wherein the reactor system is making ethylene-butene-propylene terpolymer.
17. The process of any of the previous embodiments, wherein at least a part of the reactor system is running under the condensing mode.
18. The process of any of the previous embodiments wherein the selectivity control agent and the activity control agent are added to the reactor separately.
19. The process of any of the previous embodiments wherein all of the external electron donors are mixed together prior to adding to the reactor.
20. The process of any of the previous embodiments wherein the catalyst system use includes an aluminum containing cocatalyst and wherein the aluminum to mixed electron donor mole ratio is in the range of from 0.5 to 4.0:1.
21. The process of any of the previous embodiments wherein at least one flow regime has a superficial gas velocity less than 20 times of the minimum fluidization velocity.
22. The process of any of the previous embodiments wherein at least one flow has a superficial gas velocity less than 15 times of the minimum fluidization velocity.
23. The process of any of the previous embodiments wherein at least one of the flow regimes has a volumetric solid holdup larger than 18%.
24. The process of any of the previous embodiments wherein at least one of the flow regimes has a volumetric solid holdup larger than 21%.
25. The process of any of the previous embodiments wherein at least one of the flow regimes has a fluidized bulk density greater than 8 lb/ft$^3$.
26. The process of any of the previous embodiments wherein at least one of the flow regimes has a fluidized bulk density greater than 10 lb/ft$^3$.
27. The process of any of the previous embodiments wherein at least one of the flow regimes has a fluidized bulk density greater than 12 lb/ft$^3$.

What is claimed is:
1. A process to make polypropylene or propylene copolymer comprising:
   a. polymerizing propylene in a reactor system having two or more different flow regimes wherein at least one of the flow regimes has a volumetric solid holdup larger than 15%;
   b. adding a catalyst system comprising a mixed external electron donor system to the reactor, wherein the mixed external electron donor system comprises at least one selectivity control agent and at least one activity limiting agent; wherein the catalyst system further comprises an aluminum containing cocatalyst and wherein the aluminum to mixed external electron donor mole ratio is in the range of from 0.5 to 4.0:1.
2. The process of claim 1 wherein the activity limiting agent is a carboxylic acid ester, a diether, a poly(alkene glycol), a diol ester, or a combination thereof.
3. The process of claim 1 wherein the activity limiting agent is selected from a benzoate, a $C_4$-$C_{30}$ aliphatic acid ester and combinations thereof.
4. The process of claim 1 wherein the activity limiting agent is selected from a laurate, a myristate, a palmitate, a stearate, an oleate or combinations thereof.
5. The process of claim 1 wherein the selectivity control agent is selected from the group consisting of an alkoxysilane, an amine, an ether, a carboxylate, a ketone, an amide, a carbamate, a phosphine, a phosphate, a phosphite, a sulfonate, a sulfone, a sulfoxide, and combinations thereof.
6. The process of claim 1 wherein the selectivity control agent corresponds to the formula $SiR_m(OR')_{4-m}$, where R is $C_{3-12}$ cycloalkyl, $C_{3-12}$ branched alkyl, or $C_{3-12}$ cyclic or acyclic amino group, R' is $C_{1-4}$ alkyl, and m is 0, 1, or 2.
7. The process of claim 6 wherein the selectivity control agent is selected from dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane.
8. The process of claim 1 wherein the mixed external electron donor system is selected from the group consisting of: dicyclopentyldimethoxysilane and isopropyl myristate; diisopropyldimethoxysilane and isopropyl myristate; dicyclopentyldimethoxysilane and poly(ethylene glycol) laurate; dicyclopentyldimethoxysilane, isopropyl myristate and poly(ethylene glycol) dioleate; methylcyclohexyldimethoxysilane and isopropyl myristate; n-propyltrimethoxysilane and isopropyl myristate; dimethyldimethoxysilane, methylcyclohexyldimethoxysilane and isopropyl myristate; dicyclopentyldimethoxysilane and n-propyltriethoxysilane and isopropyl myristate; diisopropyldimethoxysilane, n-propyltriethoxysilane and isopropyl myristate; dicyclopentyldimethoxysilane, tetraethoxysilane and isopropyl myristate; dicyclopentyldimethoxysilane, diisopropyldimethoxysilane, n-propyltriethoxysilane and isopropyl myristate; and combinations thereof.
9. The process of claim 1 wherein the mixed external electron donor comprises three or more different electron donors.
10. The process of claim 1 wherein the reactor system has two or more flow regimes selected from the group consisting of homogeneous fluidization, bubbling fluidization, turbulent fluidization, fast fluidization, spouted bed, spout-fluid bed, pneumatic convey (dense-phase and dilute phase), packed bed (fixed bed), packed (or fixed) moving bed and systems with multiple flow patterns within a single polymerization zone.
11. The process of claim 10 where the reactor system operates under two flow regimes; one is fast fluidization, and the other is packed moving bed.

12. The process of claim 1 wherein at least one of the flow regimes has the superficial gas velocity less than 23 times of the minimum fluidization velocity.

13. The process of claim 1, wherein the reactor system is making polypropylene homopolymer, ethylene-propylene copolymer, butene-propylene copolymer or an ethylene-butene-propylene terpolymer.

14. The process of claim 1, wherein at least a part of the reactor system is running under the condensing mode.

15. The process of claim 1 wherein the selectivity control agent and the activity limiting agent are added to the reactor separately.

16. The process of claim 1 wherein all external electron donors in the mixed external electron donor system are mixed together prior to adding to the reactor.

17. The process of claim 10 wherein at least one of the flow regimes has a fluidized bulk density greater than 8 lb/ft$^3$.

* * * * *